US012147933B2

(12) United States Patent
Vaccaro et al.

(10) Patent No.: US 12,147,933 B2
(45) Date of Patent: Nov. 19, 2024

(54) AUTOMATED PACKAGING ASSEMBLY LINE FOR PERISHABLE ITEMS

(71) Applicant: Hungryroot, Inc., New York, NY (US)

(72) Inventors: Luke Joseph Vaccaro, Westfield, NJ (US); Da Kong, Syosset, NY (US); Michael Curtes, Brooklyn, NY (US); Benjamin Pierce Mckean, Mooresville, NC (US)

(73) Assignee: HUNGRYROOT, INC., New York, NY (US)

( * ) Notice: Subject to any disclaimer, the term of this patent is extended or adjusted under 35 U.S.C. 154(b) by 353 days.

(21) Appl. No.: 17/680,992

(22) Filed: Feb. 25, 2022

(65) Prior Publication Data

US 2022/0391833 A1 Dec. 8, 2022

Related U.S. Application Data

(60) Provisional application No. 63/196,468, filed on Jun. 3, 2021.

(51) Int. Cl.
*G06Q 10/0833* (2023.01)
*B65B 43/26* (2006.01)
(Continued)

(52) U.S. Cl.
CPC ....... *G06Q 10/0833* (2013.01); *B65B 43/265* (2013.01); *B65B 55/20* (2013.01);
(Continued)

(58) Field of Classification Search
CPC .................. G06Q 10/0832; G06Q 10/087
(Continued)

(56) References Cited

U.S. PATENT DOCUMENTS

| 7,085,687 | B2 | 8/2006 | Eckenwiler et al. |
| 7,130,771 | B2 | 10/2006 | Aghassipour |
| 8,375,730 | B2 | 2/2013 | Haarmann et al. |
| 10,452,789 | B2 | 10/2019 | Madmony et al. |
| 10,706,387 | B1 | 7/2020 | Cui et al. |
| 10,955,182 | B2 | 3/2021 | Ominsky et al. |
| 11,511,927 | B2 * | 11/2022 | Madanagopal .... B65D 81/3823 |

(Continued)

FOREIGN PATENT DOCUMENTS

| JP | 2017215793 A | * 12/2017 |
| JP | 2020013509 A | * 1/2020 |

OTHER PUBLICATIONS

"How to Ship Perishables," by Fedex, Oct. 15, 2020 (Year: 2020).*

*Primary Examiner* — Jeff Zimmerman
*Assistant Examiner* — Brian Adams Heflin
(74) *Attorney, Agent, or Firm* — Davis, Malm & D'Agostine, P.C.; Richard L. Sampson

(57) ABSTRACT

An automated apparatus and method for configuring and producing packaging for orders of variable configurations of perishable items includes an automatic case erector-sealer; a packing liner dispenser; a cold pack dispenser; a control system; a point of sale ecommerce platform; and a data processor to capture order configuration, order destination, and available order points of origin. The control system captures and uses the order configuration, destination, and delivery date, to generate a time in transit (TNT), total volume, cold volume, and ambient volume, of items in the order. The total volume and cold volume are used to generate a product cube category (PCC). The TNT and the PCC are used to generate a packaging configuration for the order. The system uses the packaging configuration to generate and send operational directives to one or more of the automatic case erector-sealer, the packing liner dispenser, and the cold pack dispenser.

33 Claims, 6 Drawing Sheets

(51) Int. Cl.
  *B65B 55/20*  (2006.01)
  *B65B 57/00*  (2006.01)
  *B65B 63/00*  (2006.01)
  *B65B 63/08*  (2006.01)
  *G06Q 10/0832*  (2023.01)
  *G06Q 10/087*  (2023.01)

(52) U.S. Cl.
  CPC ............ *B65B 57/00* (2013.01); *B65B 63/005* (2013.01); *B65B 63/08* (2013.01); *G06Q 10/0832* (2013.01); *G06Q 10/087* (2013.01); *B65B 2210/04* (2013.01)

(58) Field of Classification Search
  USPC ........................................................ 705/332
  See application file for complete search history.

(56) References Cited

U.S. PATENT DOCUMENTS

| | | | |
|---|---|---|---|
| 2001/0017023 A1* | 8/2001 | Armington | B65B 55/20 |
| | | | 53/472 |
| 2002/0178074 A1* | 11/2002 | Bloom | G06Q 20/00 |
| | | | 705/26.81 |
| 2008/0291033 A1* | 11/2008 | Aghassipour | G06Q 50/40 |
| | | | 340/584 |
| 2014/0279669 A1* | 9/2014 | Bruns | G06Q 10/0631 |
| | | | 705/341 |
| 2017/0146277 A1 | 5/2017 | Newman et al. | |
| 2019/0137162 A1* | 5/2019 | Ominsky | F25D 29/003 |
| 2019/0219320 A1 | 7/2019 | Wood et al. | |
| 2019/0315553 A1 | 10/2019 | Fiflis et al. | |
| 2020/0182526 A1* | 6/2020 | Nevo | A61F 7/10 |
| 2021/0188517 A1* | 6/2021 | Kilmer | B65D 81/3862 |

* cited by examiner

FIG. 3 Cold Volume Categories

| Category | Min | Max |
|---|---|---|
| XXS | 0 | 650 |
| X-Small | 651 | 750 |
| Small | 751 | 900 |
| Medium | 901 | 1,000 |
| Large | 1,001 | 1,200 |
| X-Large | 1,201 | 1,550 |
| XXL | 1,551 | 1,750 |
| Triple XL | 1,751 | 2,200 |

FIG. 4 Total Volume Categories

| Category | Min | Max |
|---|---|---|
| XXS | 0 | 650 |
| X-Small | 651 | 750 |
| Small | 751 | 900 |
| Medium | 901 | 1,000 |
| Large | 1,001 | 1,200 |
| X-Large | 1,201 | 1,550 |
| XXL | 1,551 | 2,000 |
| Triple XL | 2,001 | 2,600 |

FIG. 5 Product Cube Table

| Ref Vol | \multicolumn{7}{c}{Total Volume} |
|---|---|---|---|---|---|---|---|---|
| | XXS | X-Small | Small | Medium | Large | X-Large | XXL | Triple XL |
| XXS | XS 2 Day | All XS | LG Climacell + XS Winter | LG Climacell + XS Winter | LG Climacell NoTop + LG Winter | XL Climacell + LG Winter | All XL | All Double XL |
| X-Small | N/A | All XS | LG Climacell + XS Winter | LG Climacell + XS Winter | LG Climacell NoTop + LG Winter | XL Climacell + LG Winter | All XL | All Double XL |
| Small | N/A | N/A | LG Climacell NoTop + XS Winter | LG Climacell NoTop + XS Winter | LG Climacell NoTop + LG Winter | XL Climacell + LG Winter | All XL | All Double XL |
| Medium | N/A | N/A | N/A | XL Climacell + XS Winter | XL Climacell + LG Winter | XL Climacell + LG Winter | All XL | All Double XL |
| Large | N/A | N/A | N/A | N/A | XL Climacell + LG Winter | XL Climacell + LG Winter | All XL | All Double XL |
| X-Large | N/A | N/A | N/A | N/A | N/A | XL Climacell + LG Winter | All XL | All Double XL |
| XXL | N/A | N/A | N/A | N/A | N/A | N/A | XL No Top + Double XL | All Double XL |
| Triple XL | N/A | N/A | N/A | N/A | N/A | N/A | All Double XL | All Double XL |

FIG. 6 Temperature Code Mapping

| Temperature | Code Map |
|---|---|
| <= 50F | Cold |
| 51-65F | Cool |
| 66-80F | Warm |
| 81-90F | Hot |
| > 90F | Hellish |

FIG. 7 Pack Configuration

| Temp Code | XS 2 Day | All XS | LG Climacell + XS Winter | LG Climacell NoTop + XS Winter | LG Climacell NoTop + LG Winter | XL Climacell + XS Winter | XL Climacell + LG Winter | All XL | XL No Top + Double XL | All Double XL |
|---|---|---|---|---|---|---|---|---|---|---|
| 1+cold | 5 | 5 | 5 | 5 | 65 | 15 | 65 | 115 | 115 | 155 |
| 1+cool | 15 | 15 | 15 | 15 | 65 | 15 | 65 | 115 | 115 | 155 |
| 1+warm | 35 | 35 | 75 | 75 | 75 | 115 | 115 | 115 | 115 | 155 |
| 1+hot | 35 | 35 | 75 | 75 | 75 | 115 | 115 | 115 | 115 | 155 |
| 1+hellish | 45 | 75 | 75 | 75 | 75 | 125 | 125 | 125 | 155 | 155 |
| 2+cold | 15 | 15 | 15 | 15 | 65 | 15 | 65 | 115 | 115 | 155 |
| 2+cool | 35 | 35 | 75 | 75 | 75 | 115 | 115 | 115 | 115 | 155 |
| 2+warm | 45 | 85 | 85 | 125 | 125 | 125 | 125 | 125 | 155 | 155 |
| 2+hot | 45 | 85 | 85 | 125 | 125 | 125 | 125 | 125 | 165 | 165 |
| 2+hellish | 45 | 85 | 85 | 125 | 125 | 125 | 125 | 125 | 165 | 165 |

FIG. 8 Pack ID Definitions

| Pack ID | Box | Liner | Vert Sleeve | Bottom Ice | Top Ice | Horiz Insert Qty | Ambient Capacity | Liner Capacity | Total Capacity | Weight |
|---|---|---|---|---|---|---|---|---|---|---|
| 5 | X-Small | XS Winter | Medium | Small | -- | -- | 0 | 1,000 | 1,000 | 88.6 |
| 15 | X-Small | XS Winter | Medium | Large | -- | -- | 0 | 1,000 | 1,000 | 120.3 |
| 25 | X-Small | XS Climacell | -- | Small | -- | -- | 0 | 750 | 750 | 88.4 |
| 35 | X-Small | XS Climacell | -- | Large | -- | -- | 0 | 750 | 750 | 119.8 |
| 45 | X-Small | XS Climacell | -- | Small | Small | 1 | 0 | 650 | 650 | 153.7 |
| 65 | Large | Large Winter | X-Large | Large | -- | -- | 0 | 1,550 | 1,550 | 135.6 |
| 75 | Large | Small Climacell | Small | Large | -- | -- | 300 | 900 | 1,200 | 137.2 |
| 85 | Large | Small Climacell | Small | Large | Small | 1 | 300 | 750 | 1,050 | 201.8 |
| 115 | X-Large | Short XL Climacell | X-Large | Small + Small | -- | -- | 450 | 1,750 | 2,200 | 186.2 |
| 125 | X-Large | Short XL Climacell | Medium | Small + Small | Small | 1 | 450 | 1,550 | 2,000 | 250.2 |
| 145 | XXL | Tall XL Climacell | X-Large | Small + Small | -- | -- | 650 | 1,750 | 2,400 | 193.8 |
| 155 | XXL | Tall XL Climacell | X-Large | Small + Small | Small | 1 | 650 | 1,750 | 2,400 | 259.0 |
| 165 | XXL | Tall XL Climacell | X-Large | Large + Large | Small | 1 | 650 | 1,750 | 2,400 | 322.4 |

AUTOMATED PACKAGING ASSEMBLY LINE FOR PERISHABLE ITEMS

RELATED APPLICATION

This application claims the benefit of U.S. Provisional Patent Application Ser. No. 63/196,468, entitled METHOD FOR OPTIMALLY FILLING AND PACKING A BOX TO DELIVER PERISHABLE ITEMS TO A DESTINATION BY TAKING CONTENT (E.G. VOLUME, COLD/CHILL/ AMBIENT, FRAGILITY) AND EXTERNAL LOGISTICAL FACTORS (E.G. TRANSIT, CLIMATE, CARRIER, ROUTE) INTO CONSIDERATION, filed on Jun. 3, 2021, the contents of which are incorporated herein by reference in their entirety for all purposes.

BACKGROUND

Technical Field

This invention relates to logistics and freight, and more particularly to an automated assembly line for packaging perishable goods having thermal sensitivity.

Background Information

Various techniques and systems are known for making the most effective use of space in a shipping carton containing perishable items such as food. Ice packs or blocks are often placed within the carton together with food that requires a refrigerated environment.

The amount of ice placed within a shipping carton along with perishable items is understood to be dependent upon the time in transit of the carton and the heat sensitivity of particular food items therein. Ice packs or blocks may be placed at various locations within the shipping carton to help maintain the internal temperature at levels optimal to the preservation of the food item. To help prevent food from being undesirably frozen or warmed, it is generally desirable to maintain the internal temperature of the shipping carton between about thirty two degrees Fahrenheit (32 F) and thirty nine degrees Fahrenheit (39 F). For simplicity, a pre-determined volume and positioning of the ice packs within the carton may be used for a wide range of typical shipments, in what is essentially a relatively coarse, one-size-fits-all approach.

Although this simple approach may be acceptable for many applications, in many instances it tends to over or under cool the shipment. In this regard, it has been recognized that the interior temperature of shipping cartons tends to vary based upon ambient temperature fluctuations. The impact may be particularly acute during particularly hot summer months or during particularly cold winter months. One solution is to use refrigerated and otherwise temperature-stabilized transport vehicles/containers, but the costs associated therewith may be prohibitive for many applications. Alternatively, even coarser estimates for the amount of ice packs may be utilized for a given set of shipping carton shipments originating from a common point and being delivered to the same geographic area. Such approaches, however, tend to exacerbate inefficiencies due to increased variances in ambient temperatures and/or time in transit. Other approaches may be used that more granularly attempt to optimize the amount of ice based on shipping routes. Such approaches, however, may be undesirably complex, without providing the desired efficiency benefits.

Accordingly, there is a need in the art for a system that automatically and efficiently determines optimal packing parameters for shipping perishable food items to various locations.

SUMMARY

The appended claims may serve as a summary of the invention. The features and advantages described herein are not all-inclusive and various embodiments may include some, none, or all of the enumerated advantages. Additionally, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

The present invention is illustrated by way of example and not limitation in the figures of the accompanying drawings, in which like references indicate similar elements and in which:

FIG. 3 is a look-up table usable with embodiments of the present invention;

FIG. 4 is another look-up table usable with embodiments of the present invention;

FIG. 5 is another look-up table usable with embodiments of the present invention;

FIG. 6 is another look-up table usable with embodiments of the present invention;

FIG. 7 is another look-up table usable with embodiments of the present invention;

FIG. 8 is yet another look-up table usable with embodiments of the present invention.

DETAILED DESCRIPTION

Figure 1:
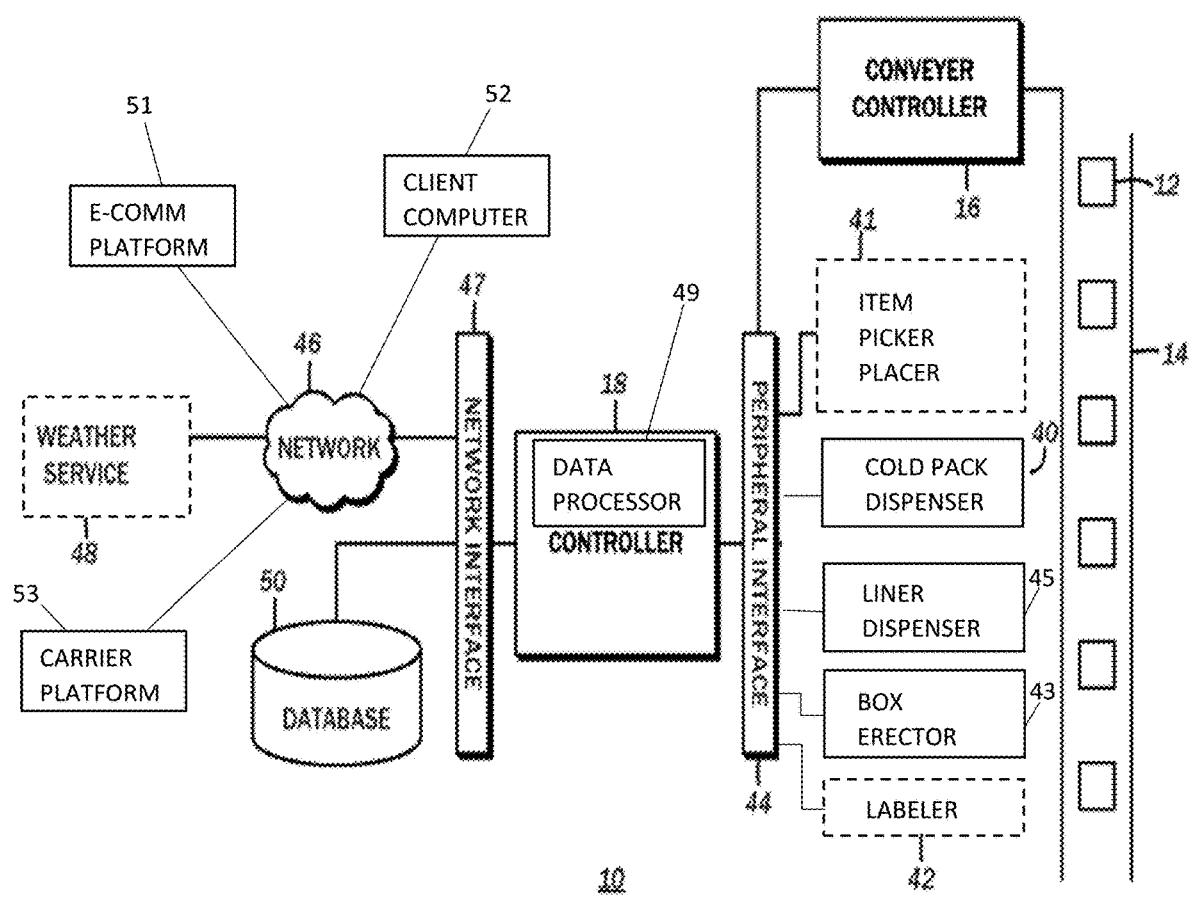
FIG. 1 is a block diagram illustrating one embodiment of an automated packaging assembly line in accordance with the present invention.

It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below. Additionally, unless otherwise specifically noted, articles depicted in the drawings are not necessarily drawn to scale. In addition, well-known structures, circuits and techniques have not been shown in detail in order not to obscure the understanding of this description. The following detailed description is, therefore, not to be taken in a limiting sense, and the scope of the present invention is defined by the appended claims and their equivalents.

General Overview

An automated packing system and method is provided that dispenses optimally sized and shaped packaging and cold packs to maintain cool temperatures across a shipping route based on factors that include the particular contents of the shipment, time in transit, and optionally, ambient temperatures at one or more locations along the shipping route. Embodiments of the present invention automatically and efficiently determine packing parameters that are relatively closely tailored to individual orders of perishable food shipments. These embodiments provide efficiency by examining the contents of the shipment to determine cold vs ambient volumes thereof, and then mapping various shipping scenarios of shipment volumes, transit times, and optionally, external temperature conditions along the shipping route, to individual packaging configurations. The present inventors have discovered that once characterized in terms of the aforementioned variables, a relatively large variety of shipping scenarios may be mapped in a relatively tailored/granular manner to a surprisingly small number of packaging configurations. This aspect advantageously tends to simplify the packaging process relative to prior approaches, e.g., by simplifying the operations of the various equipment used to implement the packing, and by reducing the need to maintain complex inventories of various packaging materials. In particular embodiments, these relative simplifications also help enable the packing, including the erecting of the shipping carton, to be provided in real-time, or near real-time, as the orders are received. In many applications these efficiencies may be achieved without the complexities of attempting to identify external temperatures at multiple locations along a shipping route.

Terminology

As used in the specification and in the appended claims, the singular forms "a", "an", and "the" include plural referents unless the context clearly indicates otherwise. For example, reference to "a processor" includes a plurality of such processors. In another example, reference to "a process" includes a plurality of such processes.

Although specific terms are employed herein, they are used in a generic and descriptive sense only and not for purposes of limitation. All terms, including technical and scientific terms, as used herein, have the same meaning as commonly understood by one of ordinary skill in the art to which this invention belongs unless a term has been otherwise defined. It will be further understood that terms, such as those defined in commonly used dictionaries, should be interpreted as having a meaning as commonly understood by a person having ordinary skill in the art to which this invention belongs. It will be further understood that terms, such as those defined in commonly used dictionaries, should be interpreted as having a meaning that is consistent with their meaning in the context of the relevant art and the present disclosure. Such commonly used terms will not be interpreted in an idealized or overly formal sense unless the disclosure herein expressly so defines otherwise.

As used herein, the terms "computer", "client computer" and "end-user device" are meant to encompass a workstation, personal computer, tablet, wireless telephone, or any other suitable computing device including a processor, a computer readable medium upon which computer readable program code (including instructions and/or data) may be disposed, and a user interface. Terms such as "server", "application", "engine", "component", "module", "control components/devices", and the like are intended to refer to a computer-related entity, including hardware or a combination of hardware and, software. For example, an engine may be, but is not limited to being: a process running on a processor; a processor including an object, an executable, a thread of execution, and/or program; and a computer. In another example, a messenger component can be a process executable on a computer or control device to process PLC interactions in accordance with an application that interfaces to a PLC that may alter one or more characteristics of PLC operations. Moreover, the various computer-related entities may be localized on one computer and/or distributed between two or more computers. The terms "real-time" and "on-demand" refer to sensing and responding to external events nearly simultaneously (e.g., within milliseconds or microseconds) with their occurrence, or without intentional delay, given the processing limitations of the system and the time required to accurately respond to the inputs.

Programming Languages

The system and method embodying the present invention can be programmed in any suitable language and technology, such as, but not limited to: Assembly Languages, C, C++; Visual Basic; Java; VBScript; Jscript; Node.js; BCMAscript; DHTM1; XML and CGI. Alternative versions may be developed using other programming languages including, Hypertext Markup Language (HTML), Active ServerPages (ASP) and Javascript. Any suitable database technology can be employed, such as, but not limited to, Microsoft SQL Server or IBM AS 400, as well as big data and NoSQL technologies, such as, but not limited to, Hadoop or Microsoft Azure.

Referring now to the Figures, embodiments of the present invention will be described.

The present disclosure contemplates multiple aspects. One aspect includes a packing system for configuring the packaging parameters, including carton size, insulation type, and the amount and placement of ice/cold packs within the carton to maintain cool temperatures throughout the shipment based on shipment contents, time in transit, and optionally, ambient temperatures at one or more locations along the transport route. The system typically includes various robotic components, e.g., a carton erector, liner dispenser, cold pack dispenser, and one or more specialized computer systems operating software or instruction sets that are configured to operate the robotic components as described herein. This system may be incorporated into a wide variety of devices that provide different functionalities. Another aspect includes a method, typically in the form of operating the various robotic components with the specialized computer systems. Still another aspect includes a computer program product. The computer program product generally represents computer-readable instructions stored on a non-transitory computer-readable medium such as an optical storage device, e.g., a compact disc (CD) or digital versatile disc (DVD), or a magnetic storage device such as a hard disk, read-only memory (ROM), and flash-type memory.

With reference to the block diagram of FIG. 1, one embodiment of the present disclosure contemplates an automated packaging assembly line 10 that dispenses an optimized amount of insulation and a thermal control component into a shipping carton 12 or other shipping unit. In a particular embodiment, the shipping carton 12 is utilized for shipping perishable goods or food items such as fresh vegetables, meat, seafood, dairy products, and the like, as well as wine, other liquid products, and substantially any type of product that may be temperature-sensitive. Shipping carton 12 may be a conventional corrugated cardboard box of the type commonly used to ship packages of all types by common and contract carriers, though any other suitable container, box, bag, or the like may be readily substituted without departing from the scope of the present disclosure.

Generally, the shipping carton 12 is carried along a conveyer system 14 or other local area transport modality to multiple stations. One station may include an automatic carton erector 43 for assembling the shipping carton 12. An example of an automatic carton erector suitable for use in embodiments of the present invention is the BER-T20CF manufactured by Berran Industrial Group, Inc. Akron, Ohio. Other stations may be configured for inserting insulative liners and/or sleeves using a liner dispenser 45, and inserting thermal control components such as cold packs, using a cold pack dispenser 40. Still other optional stations, shown in phantom, may include an item picker/placer 41 for filling the carton 12 with shipping goods, and/or a labeler 42 for applying shipping labels to the cartons 12. Conventional robotic arm systems, such as discussed in greater detail hereinbelow, may be used for any one or more of stations 40, 41, and 45. An example of robotic arm system that may be suitable for various applications of the embodiments disclosed herein, includes the FANUC LR-10iA/10 compact 6-axis robot designed for machine tending and picking applications (Fanuc America Corporation, Oakland County, Mich.).

While the present disclosure makes repeated reference to thermal control components and/or cold packs, it should be understood that in various embodiments, these terms refer to one or more cold packs including ice. However, this example is not intended to be limiting, and other examples of thermal control components include "dry" ice, ethylene/diethylene glycol gels and liquids, and so forth. Moreover, to the extent the automated packaging assembly line 10 is contemplated for use in colder regions requiring warming functions and temperate condition stabilization beyond that which can be provided with insulation, the thermal control component may also refer to a heater compound. For the sake of convenience, however, the thermal control component may simply be referenced hereinbelow as a cold pack, though it will be appreciated that whenever such term is used, it is applicable to substantially any other thermal control component.

In the embodiment of FIG. 1, the automated packaging assembly line 10 may include a conveyer controller 16 that selectively drives the conveyer system 14. That is, an item placed on the conveyer system 14, e.g., the shipping carton 12, is advanced from one station to the next upon completion of a previous station. The selective advancement of the conveyer system 14 may be regulated by the conveyer controller 16, though it is understood that the higher level logic to detect when a station is complete and the conveyer system 14 is to be moved such that the shipping carton 12 advances to the next station may be processed by a control system (controller) 18.

The controller 18 is configured to perform calculations, processes, operations, and/or functions associated with a set of pre-programmed instructions. In one aspect, certain processes and steps discussed herein may be implemented as a series of instructions (e.g., software program) that reside within computer readable memory units and are executed by one or more processors of the controller 18. When executed, the instructions cause the controller 18 to perform specific actions such as described herein. With additional reference to the block diagram of FIG. 2, the controller 18 includes a central processing unit 20 that execute the pre-programmed instructions. As will be recognized by those having ordinary skill in the art, the central processing unit 20 may be any type of conventional data processing device that is programmable with executable instructions to perform various functions. In this regard, the central processing unit 20 may be an application-specific integrated circuit (ASIC), a programmable logic array (PLA), a field programmable gate array, or any other suitable device.

In particular embodiments, central processing unit 20 is connected to an address/data bus 22 over which different components of the controller 18 communicate and exchange data. There may be volatile memory 24, also referred to in the art as random access memory or RAM, which temporarily stores data and instructions for immediate and fast access by the central processing unit 20. The controller 18 may also include a non-volatile memory 26 such as read-only memory or ROM, electrical erasable programmable read-only memory (EEPROM), flash memory, and so on that may store static information and instructions for the central processing unit 20 such as the code for a BIOS (basic input/output system) and other such firmware. Both the volatile memory 24 and the non-volatile memory 26 are connected to the central processing unit 20 over the address/data bus 22.

The controller 18 may additionally exchange data with devices external thereto. In this regard, there may be a communications interface 28 that is connected to the central processing unit 20 over the address/data bus 22. The communications interface 28 is understood to include such components as serial ports, modems, network interface cards (both wired and wireless), and others. Typically utilized in industrial applications to interconnect various components and enable data communications is a Controller Area Network (CAN), and so in one embodiment, the communications interface 28 may be a CAN controller. The communications interface 28 may also be an Ethernet network interface card, an RS-485 transceiver, and so on.

Unlike a general-purpose interactive computer system, the controller 18, once configured for automated operation, may require little user intervention. In order to allow an administrator to set configuration options and troubleshoot, the controller 18 may include a display device 30 and one or more input devices 32. One example of a display device is a fully graphical monitor or screen, though any other device that generates an output perceptible by the user may be utilized, such as LED indicators, loudspeakers, buzzers, and so forth. With respect to the input device 32, in a typical configuration this may be an alphanumeric keyboard that may be used by an operator to input commands and other information, set configuration options, and navigate a user interface presented on the display device 30. In another variation, the input device 32 may be a mouse, trackpad, touch screen, or other like cursor control device that likewise may be used to navigate a user interface on the display device 30.

Although the block diagram depicts the display device 30 and the input device 32 as being directly connected to the address/data bus 22, it is understood that this is for simplification purposes only. Conventional display devices 30 may connect to a graphics card via one of several well-known display interconnect standards (which define both physical and logical connections) such as VGA, HDMI, DisplayPort, and others. Along these lines, conventional input devices 32 typically utilize Universal Serial Bus (USB) interconnects, though specialized legacy interconnects may also be utilized.

The controller 18 may also include or at least be connectible to one or more optional data storage devices 34. Like the specific interfaces used for connecting the aforementioned display device 30 and the input device 32, the data storage device 34 may also use specific interfaces such as Serial ATA, Fiber Channel, SCSI, and the like. The data storage device 34 is configured to store data utilized in the presently disclosed system and/or computer executable instructions implementing the methods of the present disclosure. The data storage device 34 may be a magnetic or optical disk drive (e.g., hard disk drive ("HDD"), floppy diskette, compact disk read only memory ("CD-ROM"), digital versatile disk ("DVD"), and so on. It will be appreciated that the controller 18 may connect to one or more of these data storage devices, or none at all.

The controller 18 is presented herein is an example computing environment usable with embodiments of the present invention. However, the non-limiting example of the controller 18 is not strictly limited to being a computer system as shown. Other computing systems may also be implemented. Indeed, the scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, one or more aspects of the present technology are implemented by utilizing one or more distributed computing environments, such as where tasks are performed by remote processing devices that are linked through a communications network, or such as where various program modules are located in both local and remote computer-storage media including memory-storage devices.

The present disclosure may be embodied as a computer program product, the corresponding machine-readable instructions being stored in a data storage device 34 that is part of the controller 18, or otherwise closely coupled thereto. Alternatively, the instructions may be stored in a non-transitory, removable data storage device such as an optical disk 36 that is read by a media reader 38 that is part of or at least closely coupled to the controller 18. The term "instructions" as used with respect to this invention generally indicates a set of operations to be performed on a computer or other data processing device, and may represent pieces of a whole program or individual, separable, software modules. Non-limiting examples of "instruction" include computer program code (source or object code) and "hard-coded" electronics (i.e. computer operations coded into a computer chip).

Referring again to the block diagram of FIG. 1, the controller 18 regulates the transport of the shipping carton 12 along the conveyer system 14, with commands being generated by the controller 18 to the conveyer controller 16. The controller 18, or the conveyer controller 16, may be connected to conventional sensors that detect conditions along the line, examples of which will be well known to those skilled in the art, though the details thereof have been omitted for the sake of simplification. The conveyer controller 16 may handle lower level functions with respect to the conveyer system 14 such as driving the motor that moves the conveyer belt, stopping the conveyer system when an obstruction is detected, and so on. Higher level functions, particularly those that may involve coordination with other stations, may be handled by the controller 18. Moreover, it should be recognized that conveyor 14 may take the form of one or more semi-autonomous robots that transport items to the various stations 43, 45, 40, etc.

An embodiment of the present disclosure contemplates the dispensing of a thermal control component, e.g., ice, into a shipping carton 12 containing perishable goods that must be maintained within a certain temperature range. To this end, the controller 18 is connected to a cold pack dispenser 40, which may be referred to more simply as a dispenser 40. In general, the dispenser 40 is understood to include a reservoir in which a cold pack is stored at a stabilized/refrigerated temperature. Via actuators, valves, and other control devices controlled by controller 18, a suitable volume of the cold pack is dispensed when the shipping carton 12 previously erected by box erector 43 becomes positioned adjacent to a dispensing nozzle. The specific volume to be dispensed is understood to vary depending on the destination of the shipping carton 12, as well as the route it traverses before reaching the destination, determined by controller 18 as discussed in greater detail hereinbelow. An example of a suitable cold pack dispenser may include an ice cube dispenser of the type commonly found in residential refrigerators, modified in accordance with the teachings herein. Alternatively, a robotic arm system may be used to pick cold packs from a cooler and place them into the carton 12.

Prior to the cold pack dispensing step, however, liner dispenser 45 may be actuated to select and dispense an insulative liner sized and shaped for the particular selection of items in a particular order. Once the liner is placed, the optional item picker/placer 41 (shown in phantom), may select one or more items in the order from a storage bin, and place the same into the shipping carton 12. Those having ordinary skill in the art will recognize that as mentioned hereinabove, a variety of robotic machinery may be utilized as the liner dispenser 45, cold pack dispenser 40, and/or item picker/placer 41. The specifics of the movement of the mechanical components may be governed by internal circuitry, but the general selection of items to place into the shipping carton 12 may be commanded by the controller 18, as it has access to order information, as discussed hereinbelow.

Particular exemplary embodiments may optionally include a shipping carton labeler 42 (shown in phantom), that affixes a destination address along with other indicia utilized for tracking the shipment. Any number of conventional carton labelers know to those skilled in the art may be usable with embodiments of the present invention. One example is the S3O—Series 3 OPEN Frame Labeler available from Tronics America, Inc., Merrillville, Ind.

Beyond the conveyer stations 43, 45, 40, and optional stations 42 and 41, there may be other stations that process or otherwise manipulate the shipping carton 12 after assembly and until it is loaded into a transport vehicle. Such additional stations are deemed to be within the purview of one having ordinary skill in the art, and the details thereof are omitted for the sake of simplicity. The controller 18 interfaces with the conveyer controller 16 and stations 43, 45, 40, etc., over a peripheral interface 44.

According to one embodiment, the controller 18 commands the dispenser 40 to add a sufficient number of cold packs to help ensure that the interior of the shipping carton 12 is maintained at a predetermined temperature to prevent spoilage of the perishable items contained therein, with the temperature at one or more locations along the shipping route being factored for optimal effect. In one implementation, for example, zip codes along the route can be used to determine an average temperature. A corresponding value on a lookup table may be retrieved based upon one or more of temperature at the point of origin, the destination, and/or the average temperature along the route, and the order configuration, in order to determine the size of the carton 12, the type of liner and amount of ice to place, and the specific placement configuration.

The placement of cold packs in the shipping carton 12 is dependent upon the location and heat sensitivity of particular food. Again, as indicated above, ambient temperature conditions may exist that affect the shipping carton 12 during transport (e.g., on a 2 day journey, etc.). The ice or cold packs are placed in the shipping carton 12 in various locations. In particular applications, the type and placement of insulative liners, along with the number and position of the cold pack(s), are configured to maintain temperatures in a 'cold' portion of the shipping carton 12 within a desired range, e.g., between 32 and 39 degrees Fahrenheit. It should be noted that the automated packaging assembly line 10 as described herein can be used with any items that are desired to be maintained at a cool temperature (any desired temperature range), including food, medicine, biologics, etc. Furthermore, although the shipping carton 12 is provided as a non-limiting example, the present invention can be used with any shipping carton, and the shipping carton can be any size or dimension.

Operation of automated packaging assembly line 10 contemplates a number of procedures. According to one aspect of the present disclosure, streaming or other weather forecast data is collected based on estimated shipping time in transit and temperatures at a desired location, e.g., points of origin and/or destination of a particular order. Referring again to the block diagram of FIG. 1, a data processor 49 operatively associated with controller 18 may establish a data communications link to an external network 46. To facilitate this connection, the automated packaging assembly line 10 may include a network interface 47, which may generally correspond to the aforementioned communications interface 28 associated with the controller 18. The external network 46 may be the Internet, and for embodiments that use weather forecast data, such data may be collected from optional streaming weather service 48 (shown in phantom) such as weather.com or weather.gov, or any other site or database in which weather forecasting data may be obtained. Historical weather data from a different service, or data stored locally on a database 50 be utilized when real-time forecasts are not yet available. As referenced herein, historical weather data is understood to be observed weather data from an earlier date, which is related to the current date. One exemplary embodiment contemplates the retrieval of weather data for the same date from the year prior, while in another embodiment, averaged values for the same date from multiple years prior may be utilized. In another aspect, all locations along the shipping route to the final delivery point may be examined. As also shown, data processor 49 may also use network interface 47 and network 46 to capture order data from an order fulfillment/e-commerce platform 51 through which customers may place food orders, e.g., via a client computer 52. Similarly, data processor 49 may exchange data with one or more carrier platforms 53.

As also shown, in various embodiments, a customer may place an order via client computer 52 for certain goods on a website/e-commerce platform 51 associated with an operator of the automated packaging assembly line 10. One example of an e-commerce platform 51 usable with embodiments hereof is the Shopify™ platform (Shopify Inc., Ottawa, ON Canada). That order, along with others, may be stored in the database 50, 30 with an order data set 52 containing the details of the order, including the items in the order, the identity of the account holder placing the order, order destination, and so forth. Phone and mail-based order fulfillment is also understood to be possible. In some embodiments, the automated packaging assembly line 10 is utilized in connection with a subscription-based meal kit delivery service, so the order placement may differ slightly from other e-commerce systems in which an order is generated in response to a purchaser specifying each purchased item. Specifically, the order may be for a broadly defined meal, rather than the individual items used in the preparation of the meal. Furthermore, because the service may be offered as a subscription, the order placement for a given meal kit may recur automatically without user intervention.

Having described aspects of the apparatus of various representative embodiments, more specific embodiments and their operation will now be described. Turning back to FIG. 1, in one exemplary embodiment, an automated apparatus 10 for configuring and producing packaging for orders of variable configurations of perishable items in real time, includes at least one automatic case erector-sealer 43 configured for constructing shipping cartons of a plurality of sizes, and at least one packing liner dispenser 45 configured to dispense insulated packing liners of a plurality of types and sizes, each type having a different thermal R value; and a cold pack dispenser 40 configured to dispense cold packs of a plurality of sizes. A control system 18 is communicably coupled to the case erector-sealer 43, the packing liner dispenser 45, and the cold pack dispenser 40. Apparatus 10 also includes a data processor 49 communicably coupled to the control system 18, which is also communicably coupled to point of sale and/or ecommerce platform 51, to a database 50, optionally to a weather service 48, and optionally to a carrier platform 53 from which shipping costs and transit time, etc., may be captured. Data processor 49 is configured to capture from one or more of items 48, 50, 51, and 53, the order configuration, order destination, available order points of origin, and weather information for at least one of the order destination and available order points of origin.

Figure 2:
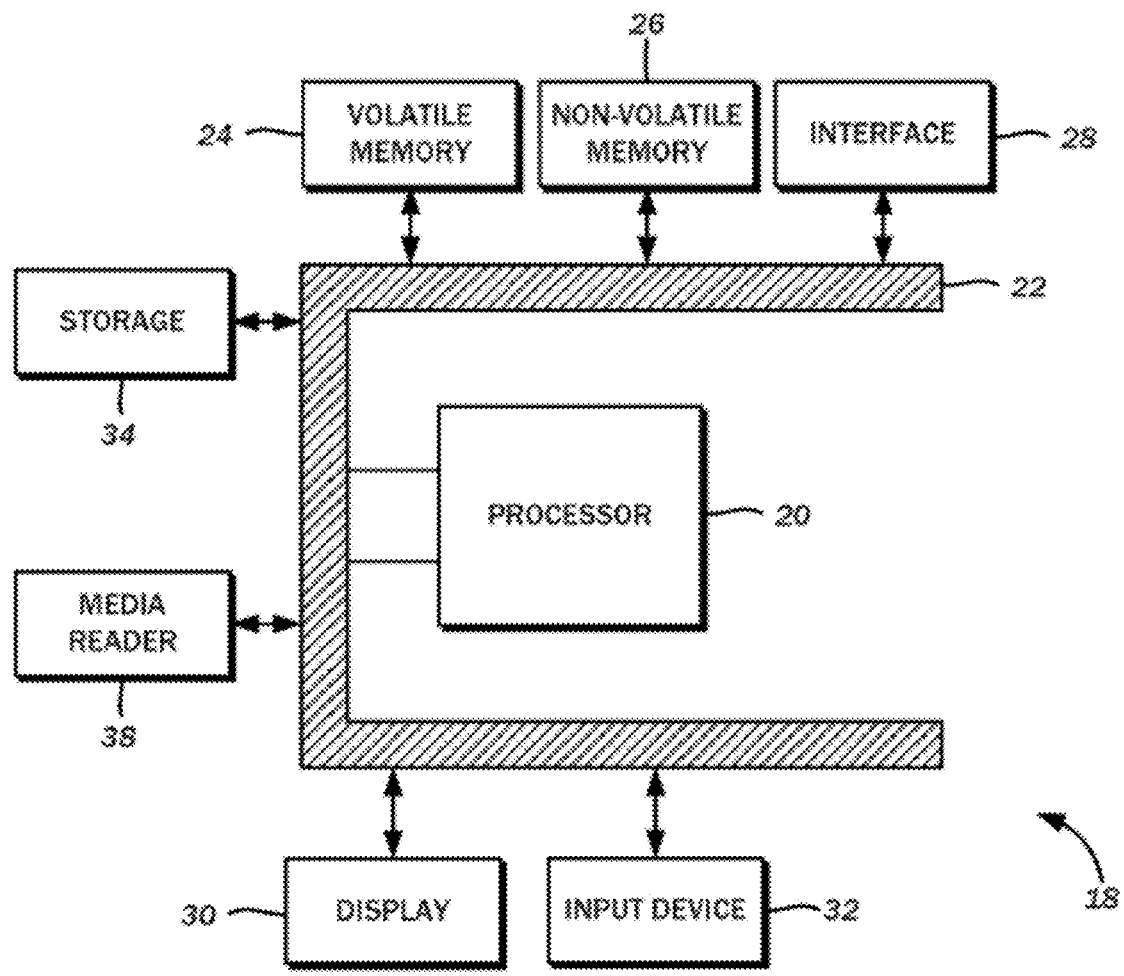
FIG. 2 is a block diagram of components of a data processing system utilized in various embodiments of the present invention.

With reference to FIG. 2, the control system 18 includes a memory 24, 26, and a processor 20, with the memory including a stored program executable by the processor. The stored program is configured to cause the control system 18 to:

(a) capture from the data processor, the order configuration, order destination, available order points of origin, expected delivery date, and weather information;

(b) optionally, use the order destination and the available order points of origin to determine an optimal point of origin (OPO) from among the available order points of origin (e.g., based on which one of the available order points of origin is closest to the order destination);

(c) optionally, use the order destination, the OPO, and the expected delivery date to select a carrier (e.g., based on shipping cost) for the order using carrier platform 53;

(d) use the order destination, the expected delivery date, and optionally the carrier and the OPO, to generate a time in transit (TNT) for the order;

(e) use the order configuration to generate a total volume of items in the order, a cold volume of items in the order requiring refrigeration, and an ambient volume of items in the order not requiring refrigeration, in which the ambient volume of items in the order may be zero;

(f) use the total volume and cold volume to generate a product cube category (PCC);

(g) use the TNT, the PCC, and optionally the weather information, to generate a packaging configuration for the order, optionally in real time, the packaging configuration including carton size, type and size of insulated packing liner, size and amount of cold packs, and placement of a partition within the carton to create a cold portion sized and shaped to receive the cold volume, and an ambient portion sized and shaped to receive the ambient volume of items in the order;

(h) use the packaging configuration to generate and send operational directives to at least one or more of the automatic case erector-sealer 43, the packing liner dispenser 45, the cold pack dispenser 40, and optionally, the item picker/placer 41 and labeler 42. In particular embodiments, the operational directives include instructions to one or more of:

(1) box erector 43 to erect a shipping carton of a particular size;

(2) liner dispenser 45 to dispense a particular type and size of packing liner; and (3) cold pack dispenser 40 to dispense a particular size and amount of cold packs.

In particular embodiments, control system 18 enters one or more of the TNT, PCC and weather information into one or more look-up tables to generate the packaging configuration. In a representative example, control system 18 enters the cold volume of a particular order into the look-up table of FIG. 3 to look up a refrigerated volume category (RVC). The system then enters the total volume of the order into the look-up table of FIG. 4 to look up a total volume category (TVC). Both the RVC and TVC are then entered into the look-up table of FIG. 5 to look up a product cube category (PCC). The control system 18 enters the weather information, e.g., current, forecasted, and/or historical weather data for at least one of the order destination and OPO, or a combination thereof, into the look-up table of FIG. 6 to look up a temperature code (TC).

The TNT, TC, and PCC are then entered into the look-up table of FIG. 7 to look-up a packaging ID (PID). The PID is then entered into the look-up table of FIG. 8 to look up packaging parameters (PP), which include: carton size; insulation liner size, thickness, and location in the carton; and cold pack size and location in the carton. Optionally, PP may include a 'vertical sleeve', as shown in FIG. 8, to be placed on top of the liner to help prevent the liner from shifting within the carton during shipment.

Optionally, the apparatus 10 includes item picker/placer 41 and/or labeler 42, controlled by the control system, and the operational directives include instructions to the item/picker placer to place the perishable items into the carton, and/or to the labeler to apply a shipping label to the carton with the destination address. The operational directives also include instructions to the conveyor 14 via conveyor controller 16, to advance the shipping carton for receiving the liner, cold packs, and optionally, the order items and label.

Figure 9:
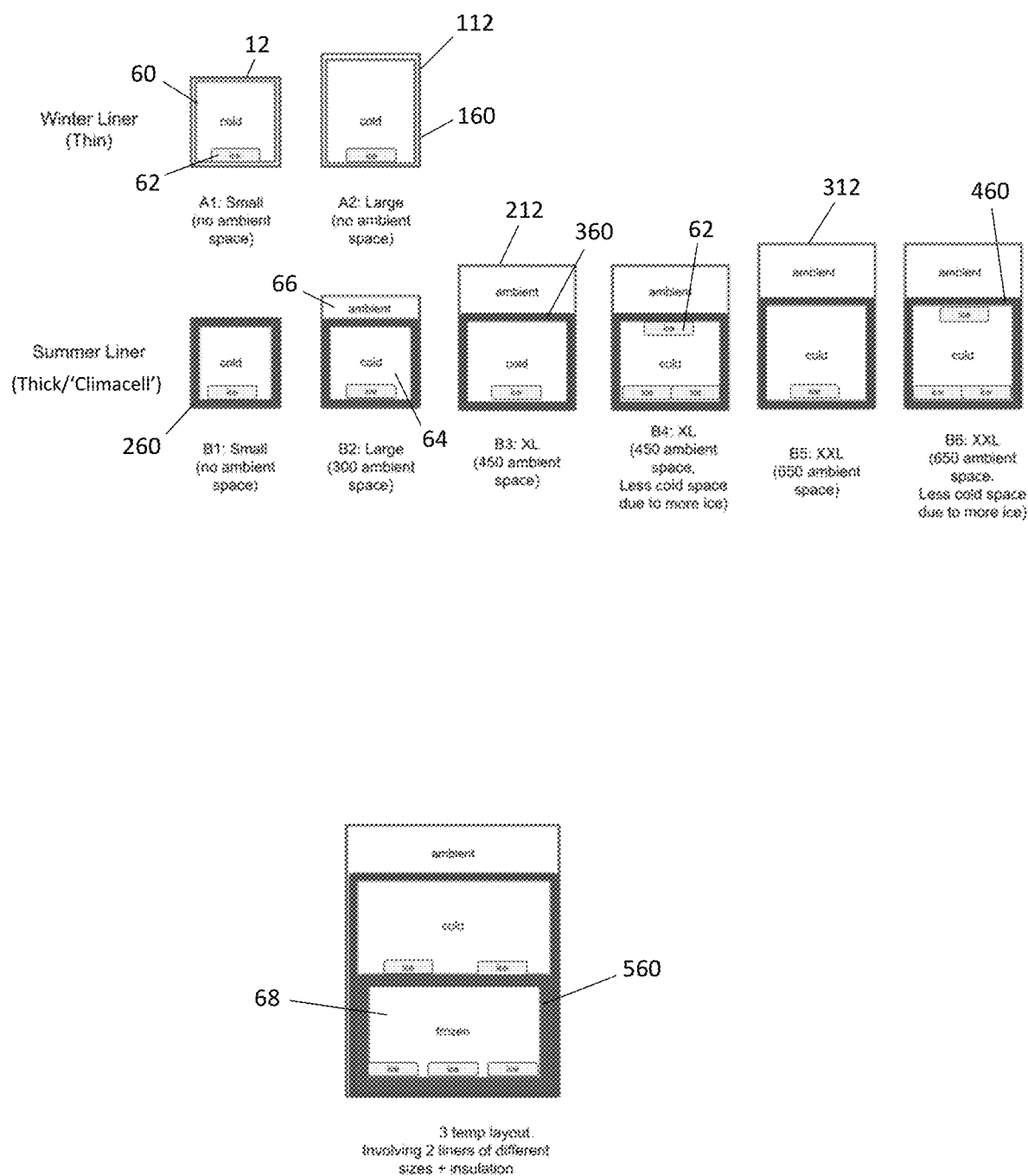
FIG. 9 is a series of schematic cross-sectional views of packaging configured in accordance with embodiments of the present invention.

Turning now to FIG. 9, a series of cartons having representative configurations are shown. These configurations include small, large, XL and XXL cartons, shown at 12, 112, 212, and 312, respectively. Example of liners include XS Winter, Large Winter, Small Summer, Short XL Summer, and Tall XL Summer, shown at 60, 160, 260, 360, and 460, respectively. Various numbers and positions of cold packs (e.g., ice) 62 are also shown. These configurations provide portions within the cartons to receive items requiring refrigeration and optionally, portions within the same carton for items that may be shipped in ambient conditions, as shown at 64 and 66, respectively. In addition, any of the cartons may be provided with a second liner, as shown at 560, to define a carton portion configured to receive frozen items, as shown at 68. It should be recognized by those skilled in the art that the configurations of FIG. 9 are merely examples, and that any number of sizes and configurations of cartons, liners, and cold packs may be used to define carton portions configured to receive items that require refrigeration, ambient, and/or frozen temperatures during shipment.

The following illustrative examples demonstrate certain aspects and embodiments of the present invention, and are not intended to limit the present invention to any one particular embodiment or set of features.

EXAMPLES

Example 1

Shipping a Small Order
a) Total Volume is 700 cu.in. All needs to be cold. 0 volume ambient. (Look-up tables of FIGS. 3-4 place the order in Category "XS" and FIG. 5 indicates Product Cube Category="All XS");
b) 1 Day Transit, and forecast is 40 degrees F. for destination. The FIG. 6 look-up table maps to Temperature Code "Cold", so "Cold+1" and PCC of "All XS" is entered into the table of FIG. 7, to yield Pack ID 5; and
c) According to the table of FIG. 8, Pack ID 5=Small box (carton), thin Winter Liner, Small Ice, shown as 12, 60, and 62 in FIG. 9. All of the order items will be placed in the Cold section 64 of the carton.

Example 2

Same as Example 1, except Cool forecast.
a) From FIG. 8, Pack ID 15=Same as Example 1, but for use of a Large Ice pack.

Example 3

Same as Example 2, except Warm forecast.
a) From FIG. 8, Pack ID 35=Same as Example 2, but for use of a thicker XS Summer Liner (note that volume capacity is reduced).

Example 4

Same example, except Warm forecast, but also 2 day transit.
a) Pack ID 85: We now have to use a Large box, with Small Summer Liner and even more ice packs (large on bottom and small on top).

Example 5

Shipping an order to zip code 63123 on a Sat May 2022.
a) Total Volume of 1166 cu.in., including Cold Volume of 940 cu.in. From FIGS. 3, 4, Category=Large. From FIG. 5, PCC="XL Climacell+LG Winter");
b) Temperature forecast for Sat May 2022 maps to Warm in FIG. 6. 1 Day transit to zip 63123;
c) From FIG. 7, 1+Warm and "XL Climacell+LG Winter" maps to Packing ID 115;
d) From FIG. 8, Packing ID 115 calls for:
 i) Box: X-Large
 ii) Liner: Short XL Climacell
 iii) Ice: 2 pieces of Small Ice on bottom, no ice on top.
 iv) 1750 vs 450 Cold vs Ambient split.

Example 6

Same as Example 5, but smaller Cold Volume of 800 cu.in. and same Total Volume of 1166 cu.in.

a) From FIG. 5, this maps to "LG Climacell NoTop+LG Winter";
b) With the same Warm+1 Day Transit, FIG. 7 maps to Packing ID 75;
c) From FIG. 8, Packing ID 75 maps to:
  i) Box: Large. (no longer needs XL, because we can use less ice.)
  ii) Liner: Small Climacell. (Smaller liner to match box size).
  iii) Ice: 1 large piece at the bottom. (slightly less cold section, needing less ice).
  iv) 900 Cold volume, 300 Ambient. (66 cu.in. of the 366 ambient content can fit in the cold section).

The foregoing embodiments automatically and efficiently determine packing parameters that are relatively closely tailored to individual orders of perishable food shipments. These embodiments provide efficiency by examining the contents of the shipment to determine cold vs ambient volumes thereof, and then mapping various shipping scenarios of shipment volumes, transit times, and optionally, external temperature conditions along the shipping route, to individual packaging configurations. The present inventors have discovered that a relatively large variety of shipping scenarios have been mappable to a surprisingly small number of packaging configurations. This aspect advantageously tends to simplify packaging requirements, e.g., by reducing the need for maintaining complex inventories of various packaging materials. In particular embodiments, these reduced complexities also help enable the packing, including the erecting of the shipping carton, to be provided in real-time, or near real-time, as the orders are received. Moreover, in many applications these efficiencies may be achieved without the complexities of attempting to identify external temperatures at multiple locations along a shipping route.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems. Moreover, the particular naming of the components, capitalization of terms, the attributes, data structures, or any other programming or structural aspect is not mandatory or significant, and the mechanisms that implement the invention or its features may have different names, formats, or protocols. Moreover, unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Embodiments of the present invention also relate to an apparatus for performing the operations herein. This apparatus may be specially constructed for the required purposes, or it may comprise a computer selectively activated or reconfigured by a computer program stored on a computer readable medium that can be accessed by the computer. Such a computer program may be stored in a tangible, non-transitory, computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), any other appropriate static, dynamic, or volatile memory or data storage devices, or other type of media suitable for storing electronic instructions, and each coupled to a computer system bus. Furthermore, the computers referred to in the specification may include a single processor or may be architectures employing multiple processor designs for increased computing capability.

In addition, the present invention is not described with reference to any particular programming language. It is appreciated that a variety of programming languages may be used to implement the teachings of the present invention as described herein, and any references to specific languages are provided for disclosure of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. It should be further understood that any of the features described with respect to one of the embodiments described herein may be similarly applied to any of the other embodiments described herein without departing from the scope of the present invention. As used in this document, "each" refers to each member of a set or each member of a subset of a set.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims. It should be further understood that any of the features described with respect to one of the embodiments described herein may be similarly applied to any of the other embodiments described herein without departing from the scope of the present invention.

Having thus described the invention, what is claimed is:

1. An automated apparatus for configuring and producing packaging for orders of variable configurations of perishable items, the apparatus comprising:
   a conveyor and motor to support and advance shipping cartons of a plurality of sizes for receiving the configurations of perishable items;
   at least one automatic case erector-sealer machine to construct the shipping cartons of a plurality of sizes (shipping cartons);

at least one packing liner dispenser robotic arm to dispense into the shipping cartons, insulated packing liners of a plurality of types and sizes, each type having a different thermal R value;

a cold pack dispenser to dispense cold packs of a plurality of sizes into the shipping cartons;

a control system communicably coupled to the conveyor and motor the case erector-sealer machine, the packing liner dispenser robotic arm, and the cold pack dispenser;

the control system having a memory and a processor, wherein the memory includes a stored program executable by the processor;

a specialized point of sale and/or ecommerce platform communicably coupled to the control system;

a data processor communicably coupled to the control system, and to the point of sale and/or ecommerce platform;

the data processor configured to capture order configuration, order destination, available order points of origin; and the stored program of the control system configured to:
(a) capture from the data processor, the order configuration, order destination, and expected delivery date;
(b) use the order destination, and the expected delivery date, to generate a time in transit (TNT) for the order;
(c) use the order configuration to generate a total volume of items in the order, a cold volume of items in the order requiring refrigeration, and an ambient volume of items in the order not requiring refrigeration;
(d) use the total volume and cold volume to generate a product cube category (PCC);
(e) use the TNT and the PCC to generate a packaging configuration for the order, the packaging configuration including carton size, type and size of insulated packing liner, size and amount of cold packs, and placement of a partition within the carton to create a cold portion sized and shaped to receive the cold volume;
(f) use the packaging configuration to generate and send operational directives to at least one or more of the conveyor and motor, the automatic case erector-sealer machine, the packing liner dispenser robotic arm, and the cold pack dispenser, the operational directives including instructions to at least one of cause the case erector-sealer machine to erect a shipping carton of a particular size, cause the conveyer and motor to advance the shipping carton along the conveyor, cause the packing liner dispenser robotic arm to dispense a particular type and size of packing liner into the shipping carton, and cause the cold pack dispenser to dispense a particular size and amount of cold packs into the shipping carton;

wherein in response to the operational directives sent by the control system, the at least one automatic case erector-sealer erects a shipping carton of a particular size (shipping carton), the at least one packing liner dispenser dispenses a particular type and size of packing liner into the shipping carton, and the cold pack dispenser dispenses a particular size and amount of cold packs into the shipping carton.

2. The apparatus of claim 1, wherein:
said data processor is communicably coupled to a weather service, and is further configured to capture weather information for at least one of said order destination and said available order points of origin; and said capture (a) is further configured to capture from the data processor, the order destination, available order points of origin, expected delivery date, and said weather information.

3. The apparatus of claim 2, wherein:
the stored program of the control system is further configured to:
use the order destination and the available order points of origin to determine an optimal point of origin (OPO) from among said available order points of origin; and
use the order destination, the OPO, and the expected delivery date to select a carrier for the order; and
said use (b) is further configured to use the order destination, the OPO, the expected delivery date, and the carrier, to generate a time in transit (TNT) for the order.

4. The apparatus of claim 3, wherein said use (e) is further configured to use the TNT, the PCC, and the weather information, to generate a packaging configuration for the order in real time, the packaging configuration including carton size, type and size of insulated packing liner, size and amount of cold packs, and placement of a partition within the carton to create a cold portion sized and shaped to receive the cold volume, and an ambient portion sized and shaped to receive the ambient volume of items in the order.

5. The apparatus of claim 3, wherein the stored program is further configured to select the OPO based on which one of the available order points of origin is closest to the order destination.

6. The apparatus of claim 1, wherein the stored program is further configured to select the carrier based on shipping cost.

7. The apparatus of claim 4, wherein said use (e) further comprises entering one or more of the TNT, PCC and said weather information into one or more look-up tables to generate the packaging configuration.

8. The apparatus of claim 7, wherein said use (e) further comprises entering the cold volume into a first look-up table to look up a refrigerated volume category (RVC).

9. The apparatus of claim 8, wherein said use (e) further comprises entering the total volume into a second look-up table to look up a total volume category (TVC).

10. The apparatus of claim 9, wherein said use (e) further comprises entering the RVC and TVC into a third look-up table to look up a product cube category (PCC).

11. The apparatus of claim 10, wherein said use (e) further comprises entering the weather information into a fourth look-up table to look up a temperature code (TC).

12. The apparatus of claim 11, wherein said weather information comprises current, forecasted, and/or historical weather data for at least one of said order destination and said available order points of origin.

13. The apparatus of claim 12, wherein said use (e) further comprises entering the destination weather information into the fourth look-up table to look up the TC.

14. The apparatus of claim 12, wherein said use (e) further comprises entering a combination of the destination weather information and point of origin weather information for the OPO, into the fourth look-up table to look up the TC.

15. The apparatus of claim 14, wherein said use (e) further comprises entering an average of the destination weather information and point of origin weather information for the OPO, into the fourth look-up table to look up the TC.

16. The apparatus of claim 11, wherein said use (e) further comprises entering the TNT, TC, and PCC into a fifth look-up table to look up a packaging ID (PID).

17. The apparatus of claim 16, wherein said use (g) further comprises entering the PID into the fifth look-up table to look up packaging parameters (PP).

18. The apparatus of claim 17, wherein the PP include: carton size; insulation liner size and thickness; and cold pack size and location in the carton.

19. The apparatus of claim 1, further comprising a network interface communicably coupled to the data processor, the weather data being retrieved over the network interface from a remote source.

20. The apparatus of claim 1, wherein the data processor is configured to capture carrier information over the network from a remote source.

21. The apparatus of claim 1, further comprising: an item picker/placer controlled by the control system to cause the item/picker placer to place the perishable items into the shipping carton in response to said operational directives.

22. The apparatus of claim 21, further comprising: a labeler machine controlled by the control system to cause the labeler to apply a shipping label to the shipping carton with the destination address in response to said operational directives.

23. The apparatus of claim 21, further comprising a conveyor communicably coupled to the control system via a conveyor controller, the conveyer configured to support and advance the shipping carton for receiving the perishable items and one or more of the liner and cold packs.

24. The apparatus of claim 1, wherein the cold packs comprise ice.

25. A method for automatically configuring and producing packaging for orders of variable configurations of perishable items, the method comprising:
   providing at least one automatic case erector-sealer configured for constructing shipping cartons of a plurality of sizes;
   configuring at least one packing liner dispenser to dispense insulated packing liners of a plurality of types and sizes, each type having a different thermal R value;
   configuring a cold pack dispenser to dispense cold packs of a plurality of sizes;
   communicably coupling a control system to the case erector-sealer, the packing liner dispenser, and the cold pack dispenser, the control system having a memory and a processor, wherein the memory includes a stored program executable by the processor;
   communicably coupling a specialized point of sale and/or ecommerce platform to the control system;
   communicably coupling a data processor to the control system, and to the point of sale and/or ecommerce platform;
   configuring the data processor to capture order configuration, order destination, available order points of origin; and
   with the stored program of the control system:
   (a) capturing from the data processor, the order configuration, order destination, and expected delivery date;
   (b) using the order destination, the expected delivery date, to generate a time in transit (TNT) for the order;
   (c) using the order configuration to generate a total volume of items in the order, a cold volume of items in the order requiring refrigeration, and an ambient volume of items in the order not requiring refrigeration;
   (d) using the total volume and cold volume to generate a product cube category (PCC);
   (e) using the TNT and the PCC to generate a packaging configuration for the order, the packaging configuration including carton size, type and size of insulated packing liner, size and amount of cold packs, and placement of a partition within the carton to create a cold portion sized and shaped to receive the cold volume;
   (f) using the packaging configuration to generate and send operational directives to at least one or more of the automatic case erector-sealer, the packing liner dispenser, and the cold pack dispenser, the operational directives including instructions to at least one of erecting a shipping carton of a particular size, dispensing a particular type and size of packing liner, and dispensing a particular size and amount of cold packs; and
   (g) responsive to operational directives sent by the control system, the at least one automatic case erector-sealer erecting a shipping carton of particular size (shipping carton), the at least one packing liner dispenser dispensing a particular type and size of packing liner into the shipping carton, and the cold pack dispenser dispensing a particular size and amount of cold packs into the shipping carton.

26. The method of claim 25, further comprising:
   communicably coupling the data processor to a weather service, and further configuring the data processor to capture weather information for at least one of the order destination and the available order points of origin; and
   wherein said capturing (a) further comprises capturing from the data processor, the order destination, available order points of origin, expected delivery date, and said weather information.

27. The method of claim 26, further comprising:
   with the stored program of the control system:
   using the order destination and the available order points of origin to determine an optimal point of origin (OPO) from among said available order points of origin; and
   using the order destination, the OPO, and the expected delivery date to select a carrier for the order; and
   wherein said using (b) further comprises using the order destination, the OPO, the expected delivery date, and the carrier, to generate a time in transit (TNT) for the order.

28. The method of claim 27, wherein said using (e) further comprises using the TNT, the PCC, and the weather information, to generate a packaging configuration for the order in real time, the packaging configuration including carton size, type and size of insulated packing liner, size and amount of cold packs, and placement of a partition within the carton to create a cold portion sized and shaped to receive the cold volume, and an ambient portion sized and shaped to receive the ambient volume of items in the order.

29. The method of claim 25, further comprising: applying a shipping label to the shipping carton with the destination address.

30. An article of manufacture comprising a non-transitory program storage medium readable by a computer, the medium tangibly embodying one or more programs of instructions executable by the computer to perform a method for automatically configuring and producing packaging for orders of variable configurations of perishable items, the article of manufacture comprising:
   a stored program configured to:
   (a) capture from a data processor, an order configuration, order destination, and expected delivery date;
   (b) use the order destination, and the expected delivery date, to generate a time in transit (TNT) for the order;
   (c) use the order configuration to generate a total volume of items in the order, a cold volume of items in the order requiring refrigeration, and an ambient volume of items in the order not requiring refrigeration;

(d) use the total volume and cold volume to generate a product cube category (PCC);

(e) use the TNT and the PCC to generate a packaging configuration for the order, the packaging configuration including carton size, type and size of insulated packing liner, size and amount of cold packs, and placement of a partition within the carton to create a cold portion sized and shaped to receive the cold volume; and (f) use the packaging configuration to generate and send operational directives to at least one or more of the automatic case erector-sealer, the packing liner dispenser, and the cold pack dispenser, the operational directives including instructions to at least one of erecting a shipping carton of a particular size, dispensing a particular type and size of packing liner, and dispensing a particular size and amount of cold packs;

wherein in response to the operational directives, the at one automatic case erector-sealer erects a shipping carton of a particular size (shipping carton), the at least one packing liner dispenser dispenses a particular type and size of packing liner into the shipping carton, and the cold pack dispenser dispenses a particular size and amount of cold packs into the shipping carton.

31. The article of manufacture of claim 30, wherein:
said capture (a) is further configured to capture from the data processor, the order destination, available order points of origin, expected delivery date, and weather information.

32. The article of manufacture of claim 31, wherein:
the stored program is further configured to:
use the order destination and the available order points of origin to determine an optimal point of origin (OPO) from among said available order points of origin; and
use the order destination, the OPO, and the expected delivery date to select a carrier for the order; and
said use (b) is further configured to use the order destination, the OPO, the expected delivery date, and the carrier, to generate a time in transit (TNT) for the order.

33. The article of manufacture of claim 32, wherein said use (e) is further configured to use the TNT, the PCC, and the weather information, to generate a packaging configuration for the order in real time, the packaging configuration including carton size, type and size of insulated packing liner, size and amount of cold packs, and placement of a partition within the carton to create a cold portion sized and shaped to receive the cold volume, and an ambient portion sized and shaped to receive the ambient volume of items in the order.

* * * * *